United States Patent [19]

Paeschke

[11] Patent Number: 4,752,149

[45] Date of Patent: Jun. 21, 1988

[54] PRETENSIONED BALL AND SOCKET JOINT

[75] Inventor: Otto Paeschke, Puttlingen, Fed. Rep. of Germany

[73] Assignee: SKF GmbH, Schweinfurt, Fed. Rep. of Germany

[21] Appl. No.: 936,490

[22] Filed: Nov. 28, 1986

[30] Foreign Application Priority Data

Nov. 30, 1985 [DE] Fed. Rep. of Germany ....... 3542425

[51] Int. Cl.$^4$ .......................... F16C 11/00; F16D 1/12
[52] U.S. Cl. ...................................... 403/129; 403/131
[58] Field of Search ................... 29/149.5 B; 403/129, 403/131

[56] References Cited

U.S. PATENT DOCUMENTS

| 1,266,061 | 5/1918 | Scoville | 29/149.5 B |
| 2,047,885 | 7/1936 | Riebe | 29/149.5 B |
| 3,179,477 | 4/1965 | Carter | 29/149.5 B X |
| 3,989,321 | 11/1976 | McCloskey | 403/129 X |

FOREIGN PATENT DOCUMENTS 1197342  6/1959  France ................. 403/129

Primary Examiner—Andrew V. Kundrat
Attorney, Agent, or Firm—Eugene E. Renz, Jr.

[57] ABSTRACT

A pretensioned ball and socket joint assembly comprising an outer ring with a spherical bore surface and two inner ring parts, biasing means urging the inner ring parts axially outward against the bore surface of the outer ring. The outer ring is a unitary single piece and has means for the introduction of the inner ring parts and the biasing means.

3 Claims, 1 Drawing Sheet

U.S. Patent   Jun. 21, 1988   4,752,149
FIG.1
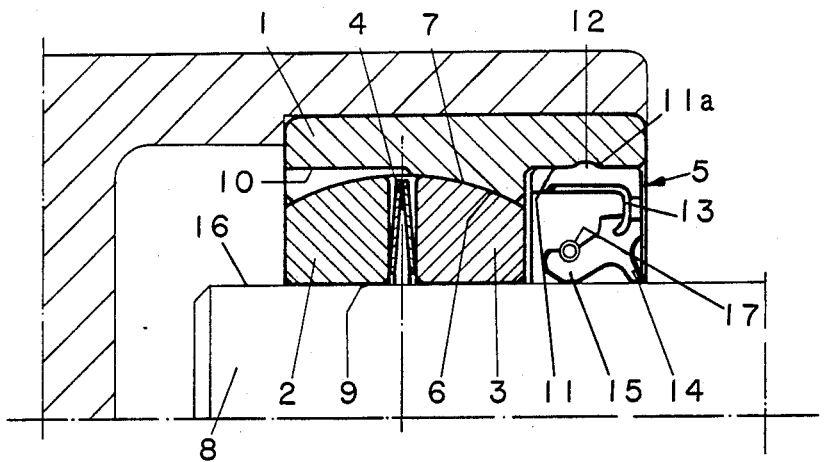
FIG.2  FIG.3  FIG.4
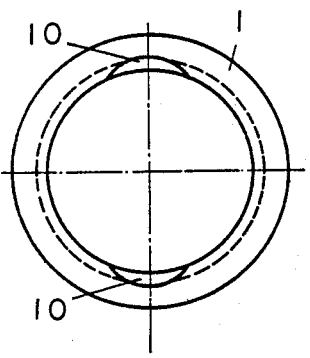 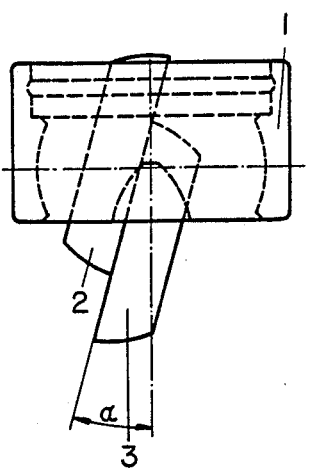 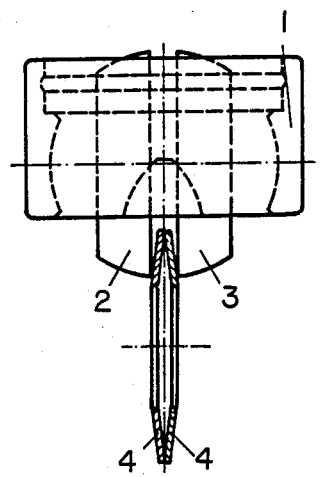
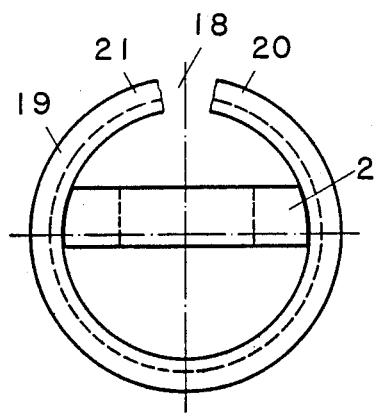
FIG.5

PRETENSIONED BALL AND SOCKET JOINT

FIELD OF THE INVENTION

The present invention relates to improvements in ball and socket joints and has particular application to a universal joint shaft centering bearing for motor vehicles which typically comprise an outer ring having a spherical bore surface and two inner ring parts which are pressed axially outward against the bore surface of the outer ring.

BACKGROUND OF THE INVENTION

Ball and socket joints of this general type are not new per se. For example, in West German Offenlegungsschrift No. 1,425,945, the bearing illustrated has an outer ring consisting of two component shells held together by rivets. This arrangement has certain disadvantages and drawbacks. For example, since the assembly consists of a series of individual parts which must be connected together by separate means, the manufacture and assembly thereof is rather tedious, time consuming and expensive. Furthermore, it is impossible to disassemble the bearing without destroying the bearing parts.

SUMMARY OF THE INVENTION

With the foregoing in mind, it is an object of the present invention to provide a pretensioned ball and socket joint which comprises relatively few parts which can be assembled and disassembled easily and wherein the ease of movement and freedom of play of the ball and socket joint is ensured over the entire service life of the bearing. To this end, the ball and socket joint made in accordance with the present invention has an outer ring designed as a unitary single element and incorporates means for the introduction of the inner ring parts and one or more springs. Further, as explained in more detail below, the outer ring is provided with two diametrically opposed assembly grooves on one side thereof having a width which is approximately the same as that of the inner ring part. In this manner, the spherical support surface of the bore of the outer ring can be made relatively large and of optimum size.

BRIEF DESCRIPTION OF THE DRAWINGS

These and other objects of the present invention and the various features and details of the operation and construction thereof are hereinafter more fully set forth with reference to the accompanying drawings, wherein:

FIG. 1 is a transverse sectional view through a ball and socket joint made in accordance with the present invention;

FIG. 2 is a side elevational view of the outer ring of the ball and socket joint shown in FIG. 1 on a smaller or reduced scale;

FIG. 3 is a view illustrating the installation of the inner ring parts into the outer ring;

FIG. 4 is a view similar to FIG. 3 with the inner ring parts in place turned and separated to define a gap therebetween for the insertion of a pair of cup springs in the bore of the outer ring; and FIG. 5 shows a modified form of ball and socket joint according to the present invention wherein only the outer ring and one inner ring part are shown.

DETAILED DESCRIPTION OF THE PREFERRED EMBODIMENTS

Referring now to the drawings and particularly to FIG. 1 thereof, there is illustrated a ball and socket joint constructed in accordance with the present invention. The assembly includes an outer ring 1, a pair of inner ring parts 2, 3, a plurality of cup springs, in the present instance two, and a sealing ring 5. The outer ring 1 is provided with a spherical bore surface 6 and the inner ring parts 2, 3 have complementary spherical lateral surfaces 7 to permit free turning movement thereof in the spherical bore surface 6. The cup springs 4 disposed between the inner ring parts 2, 3 press the parts in opposite axial directions and urge the inner ring parts 2, 3 against the spherical bore surface 6 of the outer ring 1 thereby ensuring contact without play so that neither the bearing play nor the friction moment can change even when pin 8 deflects outward at a tipping angle.

Accordingly, in operation of the ball and socket joint assembly, when the pin 8 oscillates in inner ring bore 9, the part of the inner ring 3 facing the movement of the pin is relieved of the radial load by the sliding friction acting axially against cup spring 4 until a small amount of play is developed at the inner ring part 3 between the spherical bore surface 6 of the outer ring and the lateral surface 7 of the inner ring part 3. Simultaneously, however, the other inner ring part 2 which cup spring 4 presses without play against bore surface 6 of the outer ring 1 has taken up the radial load and the centering function so that the load is absorbed alternately and without play by the two inner ring parts 2, 3. To facilitate assembly of the inner ring parts, the outer ring, which, as illustrated, is formed of a single unitary piece, is provided on the side facing away from the sealing ring 5 with two diametrically opposed assembly grooves 10 extending inwardly from the axial end face thereof. In order to provide a spherical support surface 6 of the bore in the inner ring 1 so that it can be as large as possible, the assembly grooves 10 are only made wide enough so that the inner ring part 2, 3 can be inserted.

FIGS. 3 and 4 show the procedure for assembling the elements of the ball and socket joint assembly in accordance with the present invention. As illustrated therein, the inner ring part 2 is first turned 90° and introduced through assembly grooves 10 into the bore 6 of the outer ring and then pivoted by an angle a of about 20° to the axis of the outer ring 1. Thereafter, the second inner ring part 3 is installed which is pivoted by the same angle a as the first inner ring part 2. The pretensioning cup springs 4 are then positioned between the inner ring parts in the manner shown in FIG. 4. It is noted that the outer diameter of cup springs 4 is only slightly smaller than that of the spherical raceway 6 in the outer ring 1. After cup springs 4 have been introduced into the space between the inner ring parts 2, 3, the inner ring bearing parts 2, 3, 4 are pivoted into the plane of the bearing to the position shown in FIG. 1. Thereafter the sealing ring 5 is pressed into place in the bore 11. Note that sealing ring 5 has a circumferentially extending radially outwardly directed bead 12 which snaps into an annular groove 11a in the enlarged bore at one axial end of the outer bearing ring to securely support the sealing ring 5 in place in the outer ring in the position shown. Sealing ring 5 is made of a resilient elastic material such as rubber and is reinforced by an L-shaped metal part 13. The sealing ring 5 as illustrated has two sealing lips 14, 15 which rest with radial pretension against lateral surface 16 of pin 8 and prevent foreign matter from intruding into the bearing and lubrication grease from escaping. In order to reinforce the sealing effect, inner sealing lip 15 is pressed against the peripheral surface of the pin 8 by a spring 17.

There is illustrated in FIG. 5 another embodiment of ball and socket joint assembly in accordance with the present invention. The general configuration and arrangement of the parts is essentially the same as that described. However, in this instance, the outer ring 19, rather than being a continuous annulus as the outer ring 1 of the previously described embodiment is a split ring with a separating line 18 extending essentially in the axial direction defining opposing ring ends 20, 21. The ring, therefore, has a certain flexibility to permit slight expansion of the ring for insertion of the inner ring bearing parts 2, 3 and the spring cups 4 which are identical to those described in the previous embodiment. Thus, in the assembly process the ring ends 20, 21 are pulled apart and the inner ring parts 2, 3 and spring 4 are introduced 90° to the plane of the bearing and then pivoted into the plane of the bearing in the manner described above.

Even though particular embodiments of the present invention have been illustrated and described herein, it is not intended to limit the invention and changes and modifications may be made therein within the scope of the following claims without departing from the scope of the invention. For example, the inner ring parts 2, 3 can be provided with recesses extending from the opposing end surfaces thereby to hold the cup rings 4 near the spherical lateral surface 7 and thus, prevent the springs from shifting in the radial direction.

SUMMARY

A pretensioned ball and socket joint consists of an outer ring (1) with a spherical bore surface (6) and two inner ring parts (2, 3), which are pressed by springs (4) axially outward against the bore surface (6) of the outer ring (1). So that the ball and socket joint consists of only a few parts, which can be assembled and disassembled easily, and so that the ease of movement and freedom of play of tha ball and socket joint remain ensured throughout the entire service life of the bearing, the outer ring (1) is designed as a single piece and has means (10) for the insertion of the inner ring parts (2, 3) and one or more springs (4).

What is claimed is:

1. A pretensioned ball and socket joint assembly comprising an outer ring with a spherical bore surface and two inner ring parts, a pin (8) engaging in the bore (9) of said inner ring parts and extending entirely through the bore of both ring parts (2, 3) biasing means urging the inner ring parts axially outward against the bore surface of the outer ring, said outer ring (1) being a unitary single piece and having means (10, 18) for the introduction of the inner ring parts (2, 3) and said biasing means (4), a sliding fit being provided between the bore (9) of the inner ring parts (2, 3) and the pin (8) on which the inner ring parts (2, 3) are seated.

2. A pretensioned ball and socket joint comprising an outer ring with a sperhical bore surface and two inner ring parts slidably received on a pin, biasing means urging the inner ring parts axially outwardly against the bore surface of the outer ring, said outer ring (1) being a unitary single piece having, on one side, a bore (11) to hold a sealing ring (5), the sealing lips of which (14, 15) are in contact with the lateral surface (16) of the pin (8) or the like, said sealing lip (15) having a spring ring (17), which exerts radial pretension inwardly against the pin (8), and having means (10, 18) for the introduction of the inner ring part (2, 3) and said biasing means (4).

3. A pretensioned ball and socket joint assembly including a journal having oscillating movements, comprising an outer ring having a spherical bore surface and two inner ring parts with biasing means for urging said parts axially outward against said bore surface, said parts having bores adapted to hold said journal, said assembly including means for introducing said inner ring parts and said biasing means into said outer rings, wherein, between said bores of said inner ring parts and said journal, on which said inner ring parts are seated, a sliding seat is provided, characterized in that the inner ring part (2, 3) facing the axial movement of the journal is positioned to be relieved during operation axially toward the spring (4) by the sliding friction between said inner ring part (2, 3) and said journal (8) and a slight clearance is provided between said spherical bore surface (6) of said outer ring (1) and the lateral surface (7) of said inner ring part (2, 3) facing the axial movement of said journal.

* * * * *